R. R. MILAS.
BELT AND HOOK UNITER.
APPLICATION FILED JULY 26, 1909.
945,185.
Patented Jan. 4, 1910.
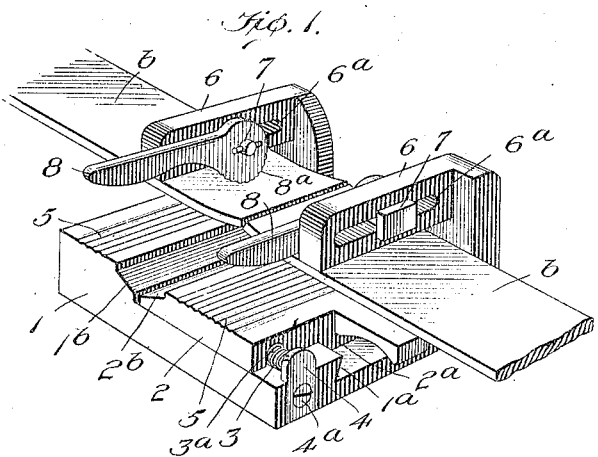
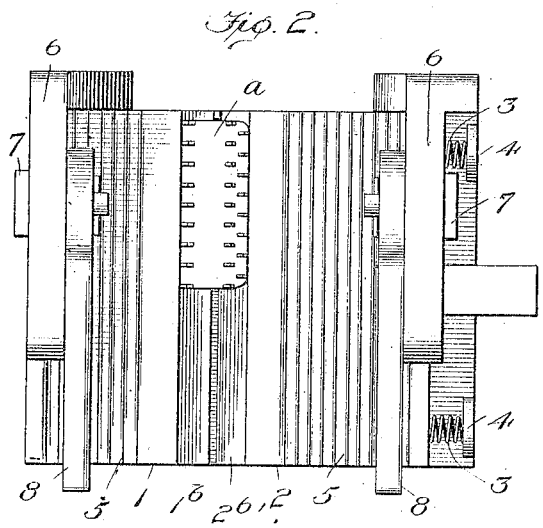
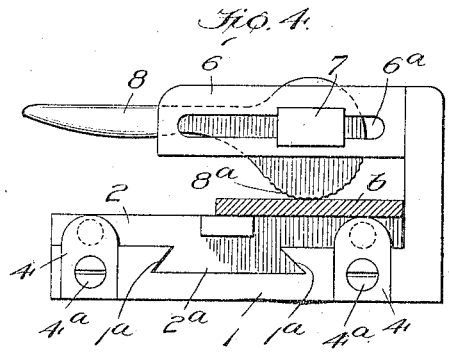
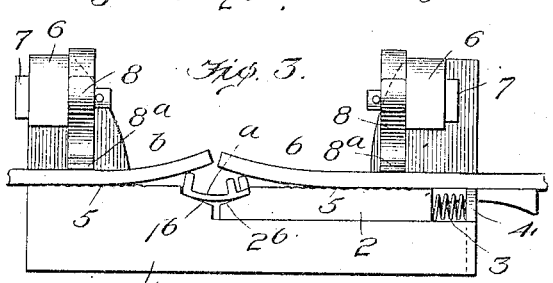
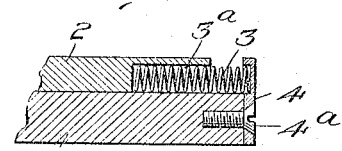
Witnesses
Edwin L. Bradford
G. P. Ritter
Inventor
Rudolf R. Milas
By F. W. Ritter Jr.
Attorney

UNITED STATES PATENT OFFICE.

RUDOLF R. MILAS, OF ROCHESTER, NEW YORK.

BELT AND HOOK UNITER.

945,185. Specification of Letters Patent. Patented Jan. 4, 1910.

Application filed July 26, 1909. Serial No. 509,683.

*To all whom it may concern:*

Be it known that I, RUDOLF R. MILAS, a citizen of the United States, residing at Rochester, in the county of Monroe and State of New York, have invented certain new and useful Improvements in Belt and Hook Uniters; and I do hereby declare the following to be a full, clear, and exact description of the invention, such as will enable others skilled in the art to which it appertains to make and use the same.

My invention relates to the construction of that class of devices commonly termed belt clamps, which are employed for holding the ends of machinery belting in apposition while permanently securing the same; and has for its several objects the provision of means which shall not only retain the belt ends in proper relation but also the fastening device or devices in proper relation to the belt ends, so as to relieve the operator of the weight of the belting and permit him to freely employ both hands in making the connection, thus dispensing with the aid of an assistant and greatly facilitating the operation.

In uniting the ends of machinery belting the old method of lacing has been largely superseded by what are commonly termed hooks, or metallic plates having a series of spurs or projections upon one face which spurs or projections are clenched after being forced into the belting. In applying such hooks it is necessary that the operator not only hold the two ends of the belt in proper relation, and the hook in proper relation to the belt ends; but also an anvil or block beneath the hook in order to support the metallic plate or hook under the clenching blows of the hammer, and this must be done with one hand as the other hand is required for using the hammer. If this has to be done in an elevated position the weight of the belting and the instability of the relation of the belt ends, hook and anvil are such as to render the work arduous, and the results inaccurate, unless a helper is employed, and the employment of a helper is frequently rendered difficult or impossible by reason of the location where the work is to be performed.

To eliminate the above noted objections to the present form of belt clamps, and effect the purposes of my invention, I combine with clamps for the belt ends an intermediate anvil or bed block to sustain the hook and support it under the clenching blows of the hammer, and such a construction embodies the main feature of my invention.

A secondary feature of my invention is embodied in the adjustability of the belt-clamps and a hook clamp intermediate of the belt-clamps, whereby a central and sufficient hold can be obtained on belts of different widths, and belt hooks of different sizes may be held in proper relation to the belt ends.

There are other, minor, features of invention residing in particular combinations and elemental constructions all as will hereinafter more fully appear.

In the drawings chosen for the purpose of illustrating my invention, the scope of which will be pointed out in the claims, Figure 1 is a perspective view of a belt and hook uniter embodying my invention, with belt ends clamped in position for securing them by means of the hook. Fig. 2 is a plan view of the belt and hook uniter, the belt ends shown in Fig. 1 being omitted in this view in order to show the position in the device of the hook—or metallic plate having spurs. Fig. 3 is a side elevation of the belt and hook uniter, showing the relation of the hook and belt ends previous to the clenching of the spurs of the hook. Fig. 4 is an end view of the belt and hook uniter, showing the adjustable feature of the belt clamp, and the connection of the hook clamp with the anvil or bed for supporting the hook under the clenching blows of the hammer. Fig. 5 is a detail sectional view showing the pressure springs which yieldingly support the hook clamp, whereby it is adapted to hooks of different sizes.

Like symbols refer to like parts wherever they occur.

I will now proceed to describe my invention more fully so that others skilled in the art to which it appertains may apply the same.

In the drawings, 1 indicates a suitable anvil or bed plate for the support of the metallic fastener or belt hook $a$, which may be provided on its upper surface with any suitable means for temporarily holding the metallic hook or belt fastening in proper relation to the belt ends.

Preferably the hook clamp is in the form of a slide 2 flush with the upper surface of the bed-plate 1 and movably secured thereto by a dovetail projection $2^a$ which enters a corresponding way 1ª in the bed plate. At its inner end this slide 2 is recessed as at 2ᵇ and forms, with a corresponding recess 1ᵇ on the bed-plate, an adjustable clamp seat for the metallic plate or belt hook a. The clamp is yieldingly supported by means of springs 3 which have one bearing on the outer end of the slide and the other on lugs or projections 4, either formed on or secured to the bed-plate 1. In the present instance the springs 3 have pockets 3ª in the slide and the lugs or projections 4 are removably secured to the bed-plate 1 by screws 4ª.

The upper surface of the anvil or bedplate 1 and of the slide 2 are preferably ridged or corrugated as at 5—5, the better to co-act with the clamp levers in holding the belt ends in proper position on the anvil or bed-plate 1.

6, 6 indicate brackets arranged over the bed-plate 1 and slide 2 parallel to each other and to the clamp seat (1ᵇ, 2ᵇ), and at such a distance above the bed-plate 1 and slide 2 as will accommodate a belt of any desired thickness. These brackets 6, 6 may be formed integral with the bed-plate 1, or separate therefrom and secured thereto in any suitable manner. Each bracket 6 is slotted longitudinally as at 6ª for the reception of an adjustable or shifting bearing 7 on which is suitably journaled a cam lever 8, preferably roughened on its cam surface, as at 8ª, and adapted, when rotated, to clamp the end of a belt to the bed-plate 1.

As the clamp seat (1ᵇ, 2ᵇ) is expansible laterally to accommodate varying widths of hooks, it will be noted that by a proper adjustment of the bearings 7 of cam levers 8 provision may be made for different widths of belting, and that whatever the width of belting may be, within a given range, the belt ends may be clamped on the center line of the belt so as to avoid any tendency to lateral displacement or canting of the belt ends. It will also be noted that the corrugations 5, 5 of the bed-plate and slide also assist in preventing any side twist or canting of the belt ends, and thus aid in securing the proper relation of belt ends and hook at the time the parts are permanently secured together.

The construction of the device being substantially such as hereinbefore pointed out, it will be employed as follows for uniting belt ends: The cam lever bearings 7 will first be adjusted in the slots 6ª so as to bring the cam levers 8 to a point which will correspond with the median line of a belt of the width to be operated upon, a belt hook a of the proper length and width is then inserted in the clamp seat (1ᵇ, 2ᵇ) formed between the bed plate 1 and the slide 2, after which the belt ends b, b to be united are placed on the bed-plate 1 under the brackets 6, 6 with the ends in apposition over the hook or fastener a and in proper alinement with each other, after which the cam levers 8, 8 are depressed to bind the ends of the belt to the bed plate 1. For the foregoing operations the operator may employ both hands, but when the belt ends are secured the operator will be relieved of the weight of the belting and the several parts will be so connected that the operator will be at liberty to employ one hand for steadying the bed-plate 1 and connected parts, and the other for using the hammer in clenching the spurs on the metallic fastener or hook. When the belt ends and hook have been firmly united, the device may be readily withdrawn laterally by simply turning the belt levers 8, 8 so as to release the belt from bed-plate 1.

Having thus described my invention, what I claim and desire to secure by Letters Patent is:

1. In a belt end uniter, the combination of spaced clamp members for securing the ends of the belt in juxtaposition, and a bed plate constituting a support for the fastener below and intermediate of the clamp members.

2. In a belt end uniter, the combination with a bed-plate having a clamp for holding the fastening device, of belt clamps for securing the belt ends in position over said fastening device.

3. In a belt end uniter, the combination with a bed-plate having a yielding slide clamp, of adjustable belt end clamps carried by said bed-plate.

4. In a belt and hook uniter, the combination with a bed plate, of brackets arranged in parallel relation over the bed plate, slidable bearings on said brackets, and cam levers journaled on said slidable bearings.

5. In a belt end uniter, the combination with a bed-plate having a spring supported clamp-slide, of slotted brackets arranged in parallel relation over the bed plate and slide, slidable journal blocks on said slotted brackets, and cam levers journaled on the slidable journal blocks.

6. In a belt end uniter, the combination with clamp members separated by an intervening space and arranged in parallel relation, of a bed plate having a fastener seat intermediate of and below the clamp members.

In testimony whereof I affix my signature, in presence of two subscribing witnesses.

RUDOLF R. MILAS.

Witnesses:
 FRANK A. WEBB,
 PETER MORRISON.